April 1, 1941.  F. H. WINTER  2,236,981
TIMING DEVICE
Filed Oct. 21, 1939
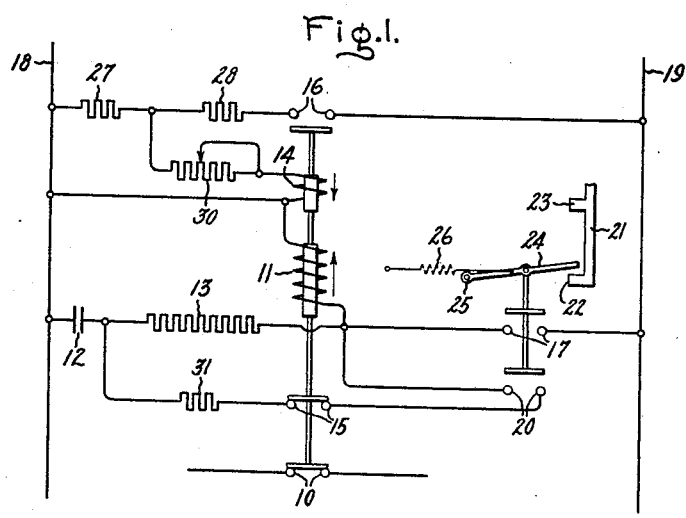
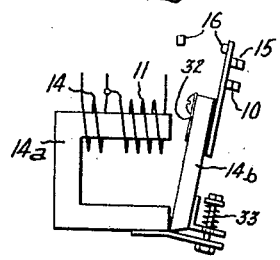
Inventor:
Fred H. Winter,
by Harry E. Dunham
His Attorney.

Patented Apr. 1, 1941

2,236,981

UNITED STATES PATENT OFFICE 2,236,981

TIMING DEVICE

Fred H. Winter, Schenectady, N. Y., assignor to General Electric Company, a corporation of New York Application October 21, 1939, Serial No. 300,603

7 Claims. (Cl. 175—320)

My invention relates to timing devices, more particularly to electric timing devices and has for its object a simple, reliable and low cost timing device, and furthermore a device which is independent of voltage changes in the electric supply circuit.

In carrying out my invention, I make use of a condenser arranged to discharge through an operating coil to give the time interval together with a voltage biasing coil for counteracting the effect of voltage changes on the time interval.

For a more complete understanding of my invention, reference should be had to the accompanying drawing, Fig. 1 of which is a wiring diagram of a timing device embodying my invention; while Fig. 2 is a side elevation view of a typical relay utilized in my invention.

Referring to the drawing, I have shown my invention in one form as applied to the time closing a predetermined interval after a predetermined event of a switch 10 in a circuit to be controlled. Instead of the switch 10, however, any suitable member may be actuated. This switch 10 is biased, as shown, by gravity, to its closed position and is operated to its open position by main operating coil 11. Connected in parallel with the winding 11 is a suitable capacitor or condenser 12 having a discharge resistance of substantially high value 13 in its circuit. A voltage compensating coil 14 is provided which is energized in a direction to oppose the winding 11. It will be understood that as shown in Fig. 2 the two windings 11 and 14 are mounted on the same magnet core 14a and arranged to operate an armature 14b biased to an unattracted position carrying the movable contact of the switch 10 and also the movable contacts of a normally closed switch 15 and a normally open switch 16.

The timing device is operated by first closing a switch 17 to energize the winding 11 from the direct current supply mains 18 and 19 and then, to get the time interval, opening the switch 17 whereupon the capacitor 12 discharges through the resistance 13 and the winding 11 so as to maintain the winding 11 energized for a predetermined time interval which is the time interval of the device and at the end of which the holding force of the winding 11 is so small that its armature drops and the switch 10 is closed. Preferably when the switch 17 is closed, a switch 20 is closed at the same time to short circuit the discharge resistance 13 so as to assure that the capacitor 12 is charged quickly.

In a typical installation, the timing device may be applied to a machine, the switches 17 and 20 being limit switches which are closed by a moving part of the machine. As shown, the machine part 21 which has longitudinally reciprocating movement is provided with spaced projections 22 and 23 for moving a lever 24 carrying the movable contacts of the switches 17 and 20 from the open position of the switches shown to the closed position, and vice versa. The arm 24 is provided with a stationary pivot 25 and with an overcenter snapping spring 26 for holding the arm 24 in either its open circuit position, shown, or its closed circuit position. Suitable means, such as a stop (not shown), is provided to limit the movement of the arm 24 in the opening direction to the position shown.

As shown, the lever 25 has been moved upward by engagement of the projection 22 therewith and the device has timed the switch 10 closed. When the projection 23 in its return movement moves the lever 24 downward to close the switches 17 and 20, the winding 11 is energized and the capacitor is connected directly across the direct current supply mains 18 and 19, the resistance 13 being short circuited through the normally closed switch 15 and the switch 20 which is then closed. It is contemplated that the capacitor will be charged fully in a very short interval of time and before the winding 11 picks up its armature. When the winding 11 picks up its armature, it opens the switch 10 and also the switch 15 which opens the short circuit around the resistance 13.

Also the switch 16 is closed which connects the coil 14 to the supply mains 18 and 19. It will be observed that the switch 16 when closed connects the potentiometer resistances 27 and 28 in series with each other across the supply mains, the coil 14 being connected in series with a variable resistance 30 in parallel with the resistance 27. It will be observed that this coil 14 is energized and its opposing force becomes effective after the coil 11 has picked up its armature. Consequently, the coil 11 has its full magnetic force available to pick up its armature.

When the switches 17 and 20, after being closed as previously described, are again opened, as shown in the drawing, the capacitor 12 discharges through the resistance 13 and the winding 11 and maintains the winding 11 energized for a predetermined time interval determined by the mechanical adjustment of the device, the size of the capacitor 12, the value of the resistance 13, and the ampere turns energization of the coil 14. When the holding force of the winding 11 becomes decreased to the point where its own force less the opposing force of the coil 14 is no longer sufficient to hold the armature picked up, the armature drops to the position shown in the drawing.

In Fig. 2 I have shown more in detail a typical magnetic core armature structure which may be used for the coils 11 and 14, this structure being substantially as shown in the Starie Patent 1,919,991, issued July 25, 1933, for Electroresponsive time element device. For the purpose of facilitating the adjustment of the device for the desired time interval, a shim 32 of non-magnetic material or substantially non-magnetic material such as bronze, or bronze with a layer of steel to take up the impact, is secured to the inner face of the armature 14b so as to engage the end of the corresponding pole on the core 14a when the armature is in its picked up or attracted position. This shim thus introduces a definite and invariable air gap between the upper end of the armature and its corresponding pole face on the core 14a. The thickness of this shim and also the material of which it is made determines to a very considerable extent the drop-out time of the armature 14b.

Preferably the spring 33 biasing the armature to its unattracted position is so adjusted and the shim is so selected as to thickness that with the coil 14 deenergized, the armature is returned to the unattracted position shown in the drawing with substantially zero ampere turns energization of the coil 11. It will be understood that when the coil 11 is deenergized, the core 14a has considerable residual magnetism tending to hold the armature in its attracted position. This adjustment of spring and shim holds good for the entire range of drop-out times of the armature. The time increases with increase in the value of the resistance 13. Preferably a resistance 13 having a relatively high resistance as compared with the resistance of the coil 11, is used. In a typical device, the coil 11 had 19,200 turns and a resistance of 2,000 ohms. The resistance 13 had a value of 20,000 ohms, while the voltage of the supply source was 250 and the size of the capacitor 12 was 200 mf.

Presumably this high ohmic resistance 13 referred to above gives a time interval longer than is needed. To get the desired time interval, the resistance 30 is adjusted to vary the ampere turns energization of the coil 14. In view of the fact that the armature is adjusted by means of the spring 33 to drop out when the ampere turns of the coil 11 are substantially zero, then with the coil 14 energized, it will drop out when the ampere turns in the coil 11 have dropped to a value equal to the ampere turns of the coil 14.

Thus if the ampere turns of the coil 14 are adjusted to equal the maximum ampere turns supplied to the coil 11 by the capacitor, then the armature will drop out almost immediately, in a fraction of a second. By including more of the resistance 30 in circuit with the coil 14 and thereby reducing the ampere turns of the coil 14, the drop-out time is increased.

In all cases the adjustment of the resistance 30 for a desired time interval is such that at the end of this time interval the remaining ampere turns of capacitor discharge in the coil 11 has dropped to a value exactly equal, within a tolerance of one or two ampere turns, to the ampere turns energization of the coil 14. The armature then drops out in accordance with its adjustment. Time intervals as high as 26 seconds have been obtained by a typical apparatus embodying my invention.

The effect of voltage changes is to increase or decrease the ampere turns charge in the capacitor 12, but this change in the charge is offset by the increase or decrease in the ampere turns energization of the coil 14 occasioned by the voltage change. In a typical device, the time of drop-out of the armature remained the same over a supply voltage range of from 150 to 280 volts, which was the maximum voltage change obtainable with the apparatus being used.

The resistance 31 is of small ohmic value and is provided to limit the current in its circuit to a value which can be easily opened by the switches.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States, is:

1. A timing device comprising a member biased to a predetermined position, a coil for moving said member to a second position, a capacitor, a resistance, a switch movable to a closed position to establish connections to energize said capacitor independently of said resistance and energize said coil thereby to charge said capacitor and move said member to its second position, a second switch operated by said member in moving to said second position for modifying said connections to establish a discharge circuit for said capacitor through said resistance and said coil in series when said first switch is opened thereby to hold said member in said second position for a predetermined interval of time after the opening of said first switch.

2. A timing device comprising a member biased to a predetermined position, a coil for moving said member to a second position, a capacitor, connection means for supplying a predetermined voltage, a switch movable to a closed position to connect said coil and said capacitor to said supply means and thereby charge said capacitor and move said member to its second position, said capacitor being connected permanently to said first coil to discharge through said first coil when said first switch is opened thereby to hold said member in said second position for a predetermined interval of time, and a second coil cooperating with said first coil energized from said connection means in opposition to said first coil thereby to compensate for the effect of changes in the voltage of said connection means on said interval of time.

3. A timing device comprising a member biased to a predetermined position, a coil for moving said member to a second position, a capacitor, connection means for supplying a predetermined voltage, a switch movable to a closed position to connect said capacitor and said coil to said supply means and thereby charge said capacitor and move said member to its second position, said capacitor being connected to discharge through said first coil when said first switch is opened thereby to hold said member in said second position for a predetermined interval of time, a second coil cooperating with said first coil, and a second switch closed by movement of said member to said second position for energizing said second coil from said connection means in opposition to said first coil thereby to compensate for the effect of changes in the voltage of said connection means on said interval of time.

4. A timing device comprising a member biased to a predetermined position, a coil for moving said member to another position, a capacitor, a resistance, a switch movable to a closed position to establish connections to energize said coil and said capacitor to charge said capacitor and move said member to its second position, a second switch operated by said member in moving to said second position for modifying said connections to establish a discharge circuit for said capacitor through said resistance in series circuit with said capacitor, a second coil cooperating with said first coil, a third switch closed by movement of said member to said second position for energizing said second coil in opposition to said first coil, said capacitor being connected to discharge through said resistance and said first coil in series when said first switch is opened thereby to hold said member in said second position for a predetermined interval after the opening of said first switch.

5. A timing device comprising a member biased to a predetermined position, a coil for moving said member to a second position, a capacitor, a resistance, a switch movable to a closed position to energize said capacitor and said coil to charge said capacitor and move said member to its second position, a second coil connected for energization in opposition to said first coil, said capacitor being connected to discharge through said resistance and said first coil in series when said first switch is opened thereby to hold said member in said second position for a predetermined interval of time after the opening of said first switch, and means for varying the energization of said second coil to vary said time interval.

6. A timing device comprising a movable armature member, spring means biasing said member to a predetermined position, a coil for moving said member to another position, said spring means being adjusted to move said member to said first position when the energization of said coil decreases to substantially zero, a capacitor, a switch movable to a closed position to energize said capacitor and said coil to charge said capacitor and move said member to its second position, a second coil cooperating with said first coil, means for energizing said second coil in opposition to said first coil with a smaller number of ampere turns than said first coil, said capacitor being connected to discharge through said resistance and said first coil in series when said switch is opened thereby to hold said member in said second position for a predetermined interval after the opening of said switch, and means for varying the energization of said second coil to vary said time interval.

7. A timing device comprising a movable armature member biased to a predetermined position, a stationary core member, a coil for moving said armature member to a second position into engagement with said stationary core member, a shim between said members, a capacitor, a resistance, means for supplying a predetermined voltage, a switch movable to a closed position to connect said coil and said capacitor to said supply means and thereby charge said capacitor and move said armature member to its second position, a second switch operated by said armature member in moving to said second position for establishing a discharge circuit for said capacitor in series with said resistance, a second coil cooperating with said first coil, a third switch closed by movement of said armature member to said second position for energizing said second coil from said supply means in opposition to said first coil, said capacitor being connected to discharge through said resistance and said first coil in series when said first switch is opened thereby to hold said member in said second position for a predetermined interval of time after the opening of said first switch and said second coil being arranged to compensate for the effect of changes in the voltage of said supply means on said interval of time.

FRED H. WINTER.